United States Patent
Hahn et al.

(10) Patent No.: US 9,251,817 B1
(45) Date of Patent: Feb. 2, 2016

(54) MICROACTUATOR GROUNDING THROUGH OVERSIZED VIA IN A DISK DRIVE SUSPENSION FLEXURE CIRCUIT

(71) Applicant: Magnecomp Corporation, Murrieta, CA (US)

(72) Inventors: Peter Hahn, Wildomar, CA (US); Kuen Chee Ee, Chino, CA (US); Long Zhang, Murrieta, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 14/748,577

(22) Filed: Jun. 24, 2015

Related U.S. Application Data

(60) Provisional application No. 62/019,419, filed on Jun. 30, 2014.

(51) Int. Cl.
   *G11B 5/56* (2006.01)
   *G11B 5/48* (2006.01)

(52) U.S. Cl.
   CPC ............ *G11B 5/4846* (2013.01); *G11B 5/4833* (2013.01); *G11B 5/4873* (2013.01)

(58) Field of Classification Search
   CPC .... G11B 5/4873; G11B 5/483; G11B 5/5552; G11B 5/486; G11B 5/4846; G11B 5/4833
   USPC ................. 360/294.4, 245.8, 245.9
   See application file for complete search history.

(56) References Cited

U.S. PATENT DOCUMENTS

| | | | |
|---|---|---|---|
| 7,781,679 B1 | 8/2010 | Schreiber et al. | |
| 7,829,793 B2 | 11/2010 | Schreiber et al. | |
| 8,508,889 B2 | 8/2013 | Kin | |
| 8,542,465 B2 | 9/2013 | Lin et al. | |
| 8,737,021 B2* | 5/2014 | Yonekura | G11B 5/4873 360/245.9 |
| 8,773,820 B1* | 7/2014 | Hahn | G11B 5/483 360/294.4 |
| 8,810,972 B1 | 8/2014 | Dunn | |
| 8,908,332 B2* | 12/2014 | Shum | G11B 5/4873 360/294.4 |
| 9,111,559 B1* | 8/2015 | Hahn | G11B 5/482 |
| 2011/0149440 A1* | 6/2011 | Uematsu | G11B 5/4826 360/245.3 |
| 2013/0242436 A1* | 9/2013 | Yonekura | G11B 5/4873 360/244.2 |
| 2014/0022674 A1* | 1/2014 | Takikawa | G11B 5/4813 360/244.5 |
| 2014/0085755 A1* | 3/2014 | Hanya | G11B 5/482 360/244.5 |

FOREIGN PATENT DOCUMENTS

JP        2013191260 A  * 9/2013

* cited by examiner

*Primary Examiner* — Will J Klimowicz
(74) *Attorney, Agent, or Firm* — Intellectual Property Law Offices of Joel Voelzke, APC

(57) ABSTRACT

A PZT grounding connection to the stainless steel substrate of a suspension flexure includes an oversized void or via in the insulating layer of the flexure, copper being plated onto the stainless steel within the void with an intermediate layer of nickel therebetween, and conductive adhesive electrically and mechanically bonding the copper within the void to the PZT. The connection provides a high quality, low resistance ground path from the PZT to the stainless steel substrate without plating gold onto the stainless steel.

20 Claims, 4 Drawing Sheets

MICROACTUATOR GROUNDING THROUGH OVERSIZED VIA IN A DISK DRIVE SUSPENSION FLEXURE CIRCUIT

CROSS-REFERENCE TO RELATED APPLICATIONS

This application claims benefit of U.S. Provisional Patent Application No. 62/019,419 filed Jun. 30, 2014.

BACKGROUND OF THE INVENTION

1. Field of the Invention

This invention relates to the field of disk drive suspensions. More particularly, this invention relates to the field of microactuator grounding in disk drive suspensions.

2. Description of Related Art

Magnetic hard disk drives and other types of spinning media drives such as optical disk drives are well known. FIG. 1 is an oblique view of an exemplary prior art hard disk drive and suspension. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. Suspension 105 is coupled to an actuator arm 103, which in turn is coupled to a voice coil motor (VCM) 112 that moves the suspension 105 arcuately in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105. In DSA suspensions such as the DSA suspension 105 of FIG. 1, in addition to voice coil motor 112 which moves the entire suspension, at least one microactuator 114 is located on the suspension in order to effect fine movements of the magnetic head slider to keep it properly aligned over the data track on the spinning disk. The secondary microactuator(s) provide much finer control and much higher bandwidth of the servo control loop than does the voice coil motor alone, which is only capable of effecting relatively coarse movements of the suspension and hence the magnetic head slider. The microactuators are commonly linear piezoelectric devices, particularly lead zirconate titanate (PZT) devices. The microactuators will henceforth be referred to herein as PZTs for simplicity of discussion, it being understood that the microactuators can be other types of devices as well.

Recent designs locate the PZTs on the suspension gimbal which holds the read/write head, or to a position in which the PZTs act directly on the gimbal. Such suspensions are called gimbal-based DSA, micro DSA or GSA suspensions. GSA suspensions do not have as great an arm length through which the PZTs act, and hence do not exhibit as much movement of the head slider in response to a unit of voltage input to the PZT microactuators, as do more traditional DSA suspension designs in which the PZTs are mounted at the mount plate such as in the suspension of FIG. 1. However, as data tracks have become narrower and narrower, hence reducing the need for as great a movement of the head slider, GSA designs have become a more attractive option to suspension designers.

Without admitting that FIG. 2 is "prior art" within the legal meaning of that term, FIG. 2 is a bottom plan view of the distal portion of a GSA suspension flexure 20 according to a previous design by the present applicant. As used herein, the term "bottom view" or "bottom plan view" means viewing the suspension from the side on which the slider is mounted. The flexure 20 is usually welded near the distal end of a load beam such as load beam 107 in FIG. 1. With the flexure 20 of FIG. 2 which includes two PZT microactuators 14, those PZTs would eliminate the need for the two PZTs 114 show in FIG. 1.

Two PZTs 14 are affixed to a rigid and non-gimbaled portion of the suspension at their proximal ends. As used herein, the term "proximal" means closest to the actuator arm at which the suspension is mounted, i.e., toward the left in FIG. 2, and "distal" means closest to the cantilevered end of the suspension, i.e., toward the right in FIG. 2. PZTs 14 act directly on the gimbaled portion of the suspension which includes PZT connecting arms or connectors 30 which are attached to the distal ends of the PZTs 14, and slider tongue 52 which carries head slider 54. Flexible connectors 30 act as connectors to transmit tensile and compressive forces, and thereby transmit push/pull movement of PZTs 14 to the gimbaled portion or the flexure specifically to the slider tongue 52 to which head slider 54 is mounted, the connectors 30 being flexible enough to allow the gimbal to pitch and roll relatively freely and thus not interfere with the normal gimbal action as head 54 slider pitches and rolls in response to surface irregularities in the surface of the data disk. Such a suspension is generally disclosed in U.S. Pat. No. 8,879,210 which is assigned to the assignee of the present application. Details of the electrical and mechanical connections to the PZTs 14 are omitted from the drawings of the present application for simplicity of illustration.

The term "stroke" or "stroke length" or "stroke sensitivity" refers to the effective amount of expansion that a PZT exhibits in response to an applied input voltage. There are advantages to high stroke length. One advantage is that a greater stroke length means that the read/write head can be servo actuated through a greater distance over the data platter, and hence can read a greater amount of data from the disk, using only the PZT microactuators which have a high servo bandwidth without needing to actuate the VCM which has a comparatively low bandwidth. Greater stoke length therefore translates into greater seek and read speeds.

If the power and ground electrical connections to the PZT microactuator are less than ideal, actuation voltage potential is lost across those connections and hence stroke length suffers. It is therefore a design goal to minimize electrical resistance of the PZTs' power and ground connections.

Without admitting that FIGS. 3 and 4 are "prior art" within the legal meaning of that term, those figures show two different grounding schemes that have been proposed by the assignee of the present application. FIG. 3 is a cross sectional view taken along section line 3-3' in FIG. 2. The PZT bottom electrode is electrically connected to a driving voltage by conductive epoxy 32 which extends to copper signal pad 34 having gold plating thereon. As used herein, the term "bottom electrode" will refer to the electrode of the PZT that is farthest away from the flexure and closest to the disk platter, and the term "top electrode" will refer to the electrode that is closest to the flexure. The copper signal pad 34 is part of the flexure's flexible circuit. The ground connection is made through an area of the flexure which has no polyimide and no copper on it. The PZT top electrode is connected to ground through conductive epoxy 42 directly to the grounded stainless steel substrate 46, optionally with a layer 47 of gold plating on the stainless steel for corrosion resistance. Stainless steel substrate 46 is sometimes referred to as the stainless steel support layer of the flexure. The flexure is affixed to load beam 12.

FIG. 4 is a cross sectional view showing an alternative flexure grounding connection, also according to a prior design by the present applicant. Both copper signal pads 34, 36 are part of the flexure's flexible circuit, with copper pad 34 being connected to a driving voltage and copper pad 36 being connected to ground. In this design the ground connection to PZT 14 is made using conductive epoxy 42 adhered to copper contact pad 36 of the flexure over polyimide layer 38. Gold layer 37 is usually plated onto the copper contact pad 36 for corrosion resistance. The copper contact pad 36 is grounded at a ground connection contact point that is not shown through any of a variety of well known structures and methods for connecting copper contact pads 36 within a suspension flexure to ground.

Neither of those two prior designs is ideal. The design of FIG. 3 requires plating gold onto the stainless steel support layer, which requires a number of additional process steps such as dry film resist (DFR) lamination and development prior to plating, and subsequent DFR removal. Such additional steps increase the cost of the flexure.

The design of FIG. 4 can utilize the existing processes of the flexure manufacturing without requiring extra process steps for gold plating, and thus that design enjoys lower manufacturing cost. However, due to the extra thickness of the copper pad 36 and the polyimide layer 38 under PZT 14, and the elastic modulus of polyimide layer 38, the PZT stroke can be significantly compromised.

SUMMARY OF THE INVENTION

The invention provides a lower resistance grounding connection from the PZT microactuator through the flexure to the grounded stainless steel substrate of the flexure. That substrate is usually grounded to the load beam of the suspension. The flexure grounding connection for the PZT includes a large void formed in the polyimide or other insulating layer, with a copper grounding pad or other metal that forms the signal conducting layer electrodeposited or otherwise deposited into that void directly onto the stainless steel including any thin metal intermediate layers on the stainless steel such as a nickel layer electrodeposited, sputtered, or otherwise deposited onto the stainless steel. The large void filled with copper constitutes a large grounding pad that can be thought of as a large metallic via extending through the polyimide layer. The copper via is oversized in the sense that its cross sectional area is larger than that of a conventional via, and larger than is necessary to ensure a basic ground connection to the stainless steel, and in fact is preferably larger than the footprint of the conductive adhesive. The PZT is adhered to the copper grounding pad by conventional means such as by conductive adhesive including conductive epoxy. The PZT is grounded through the conductive adhesive, the plated conductor in the void, and the grounded metal substrate. With such a grounding structure the expensive process step of electroplating gold onto the stainless steel substrate as part of the flexure grounding connection to the PZT can be eliminated. The copper or other plated conductor preferably completely fills the void in the polyimide.

With this structure, a vertical line can be drawn that extends through the grounded stainless steel substrate, any intermediate metal layer such as nickel on the stainless steel substrate, conductive adhesive, and the bottom electrode of the PZT, all without passing through any gold plating on the stainless steel.

The metal substrate of the flexure typically includes both the metal substrate of the suspension electrical circuit, as well as the suspension gimbal, formed integrally from a single continuous sheet of stainless steel. The head slider is mounted to the gimbal to allow the slider to pitch and roll freely as it travels over the spinning magnetic media data platter. The invention therefore includes an oversized plated metallic via through the insulating layer of the flexure, to the same stainless steel sheet of which both the metal support layer of the suspension circuit and the suspension gimbal are integrally formed.

Additionally, an insulating cover layer such as polyimide is normally applied over the side of the flexure containing the copper signal traces to provide electrical insulation and corrosion protection to those traces. The cover layer may be specifically applied onto the copper that is adjacent the conductive adhesive, to form a dam. The dam helps to prevent and contain any overflow of the conductive adhesive.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
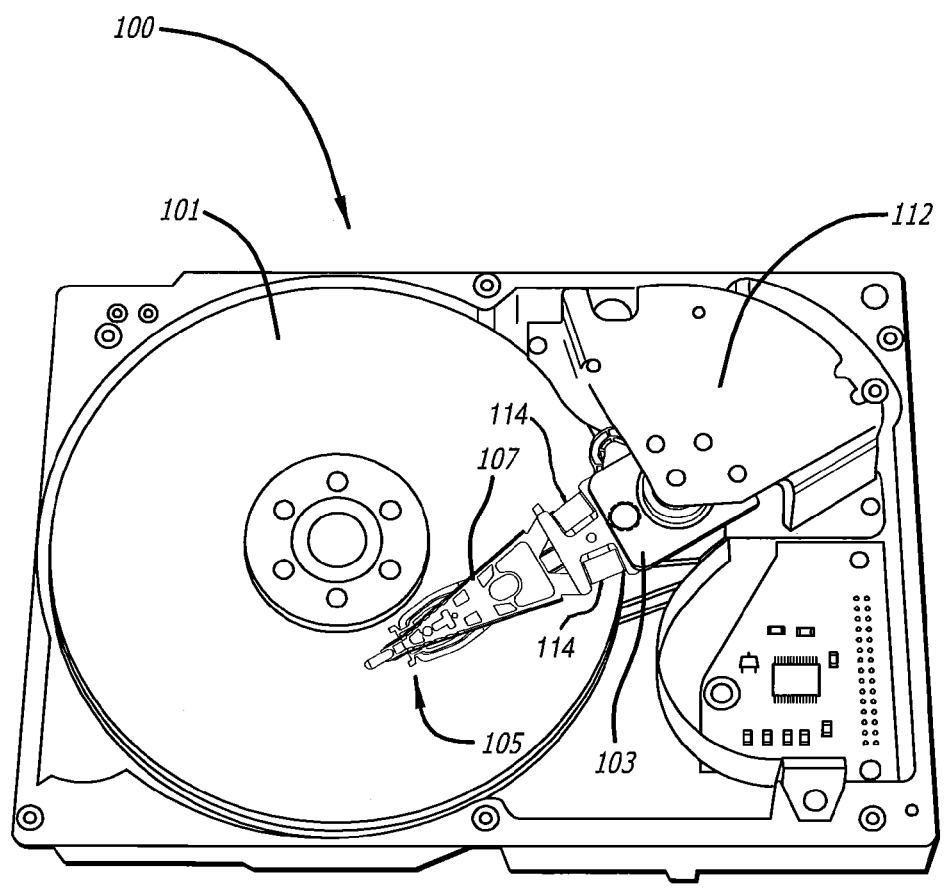
FIG. 1 is an oblique view of a generalized prior art DSA suspension.
Figure 2:
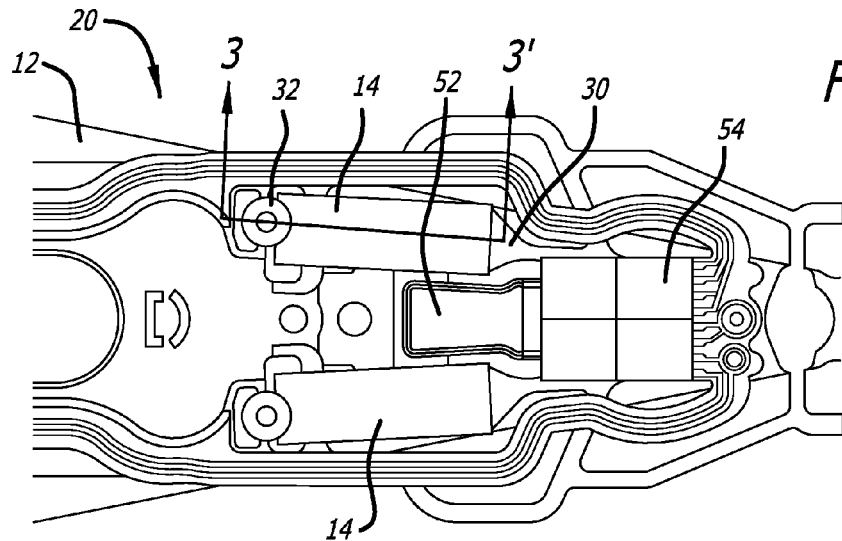
FIG. 2 is a bottom plan view of a prior GSA suspension by the present applicant.
Figure 3:
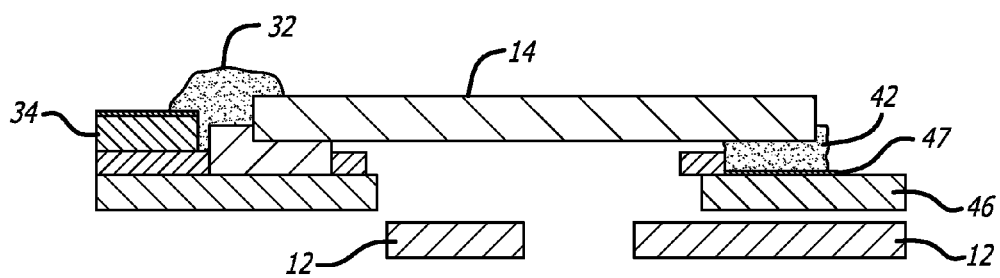
FIG. 3 is a cross section taken along section line 3-3' of FIG. 2, according to a first prior design by the present applicant.
Figure 4:
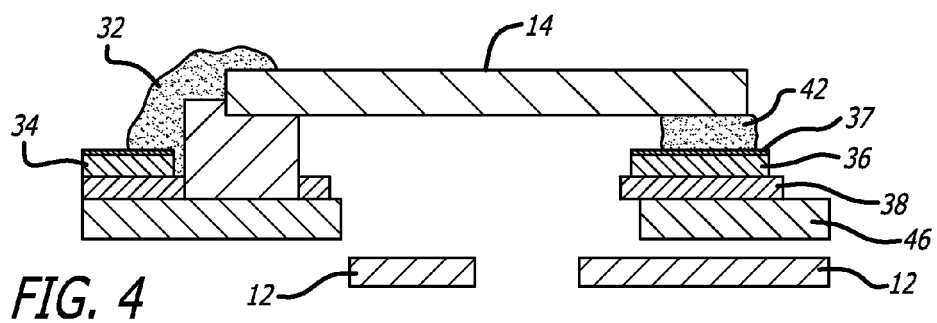
FIG. 4 is a cross section taken along section line 3-3' of FIG. 3, according to a second prior design by the present applicant.
Figure 5:
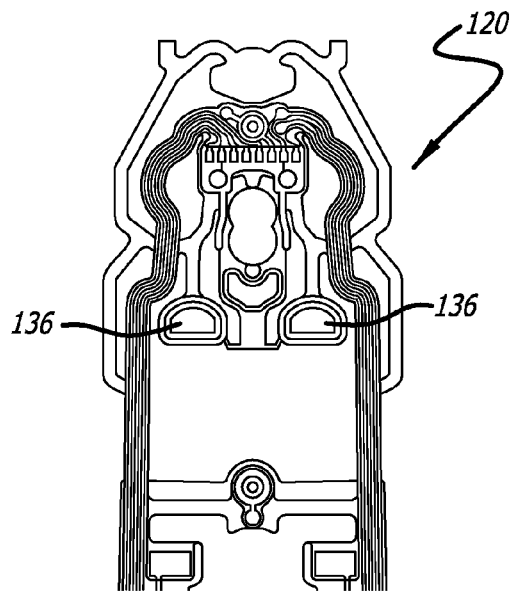
FIG. 5 is a bottom plan view of a flexure of a suspension according to a first exemplary embodiment of the invention.

FIG. 5 is a bottom plan view of a flexure 120 of a suspension according to a first exemplary embodiment of the invention. The PZTs and the head slider are not shown for clarity of illustration. Copper contact pads 136, through which the ground connection for the PZTs will be made, are visible.

Figure 6:
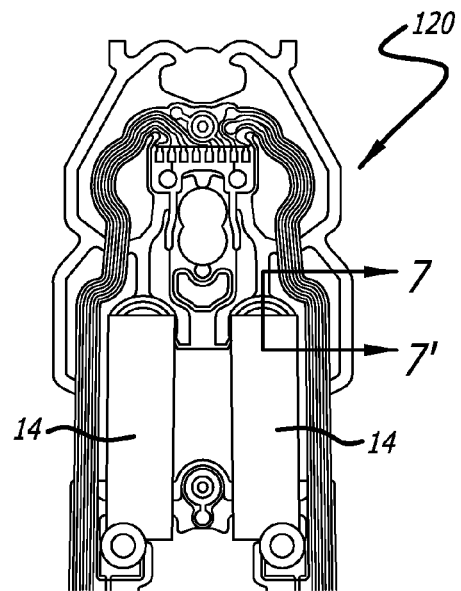
FIG. 6 is a bottom plan view of the suspension of FIG. 5 including PZT micro actuators.

FIG. 6 is a bottom plan view of the flexure 120 of FIG. 5 including PZTs 14.

Figure 7:
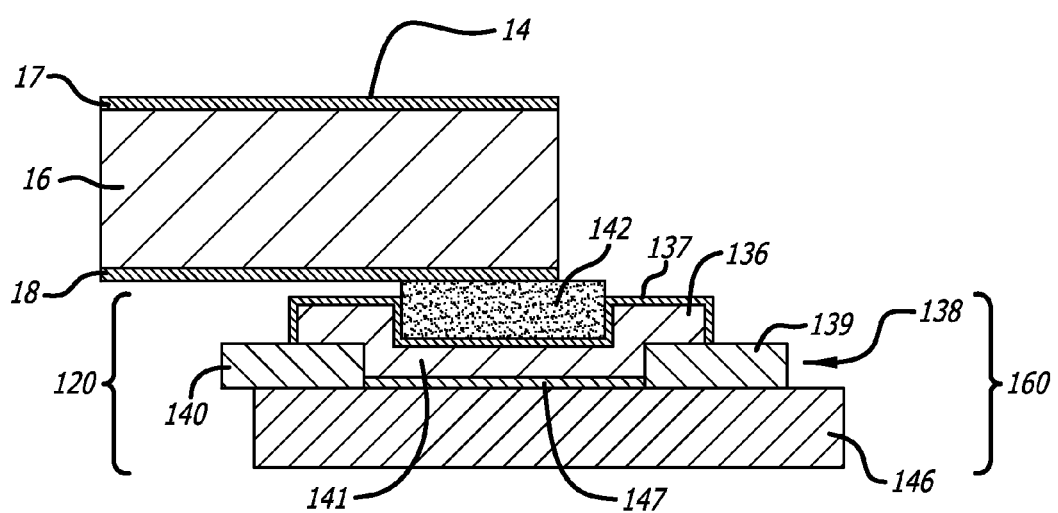
FIG. 7 is a sectional view of the suspension of FIG. 6 taken along section line 7-7'.

FIG. 7 is a sectional view of the flexure 120 of FIG. 6 taken along section line 7-7' including grounding structure 160. Flexure 120 includes a grounded metal support layer 146 which is typically stainless steel, an insulating layer 139/140 which is typically polyimide, and a signal conducting layer 136 which is typically copper or a copper alloy such as copper/beryllium. PZT 14 includes PZT element 16 and gold layers 17, 18 that form the PZT's bottom and top electrodes 17, 18 respectively. Stainless steel support layer 146 of the flexure is grounded by any one of various conventional techniques. During formation of the flexure 120, a large gap or void 141 is formed in polyimide layer 138, and specifically between polyimide sections 139 and 140. An intermediate layer 147 of metal such as nickel is optionally deposited into the void and onto stainless steel support layer 146 such as by electrodeposition or by sputtering. Intermediate layer of nickel 147 helps to prevent copper from diffusing into the stainless steel. Copper or another metal signal conductor is deposited into void 141 and onto stainless steel 146 including intermediate layer 147, preferably completely filling void 141 and also extending onto polyimide sections 139, 140. The copper defines copper contact pad 136. Preferably gold layer 137 or other corrosion resistant metal is electrodeposited onto copper contact pad 136 to help prevent corrosion. The copper and/or other metal(s) within void 141 now defines a metallic via 141 that lies at electrical ground potential.

Metallic via 141 is larger than standard vias. Via 141 has a cross-sectional area (in the x- and y-directions, or the horizontal directions as viewed in the figure), whose square root is preferably at least 5 times as large as the thickness of polyimide layer 138, and more preferably still at least 10 times as large as the thickness of the polyimide layer. Roughly speaking, via 141 has horizontal dimensions that are at least 5 times the thickness of insulating layer 138, and more preferably at least 10 times the thickness of insulating layer 138. Via 141 preferably has a cross-sectional area that is at least half as large as the footprint of conductive adhesive 142 including where conductive adhesive 142 contacts the goldplate copper layer 136, and preferably has a cross-sectional area that is larger than the footprint of conductive adhesive 142. Such a large void in the polyimide and the resulting metallic via helps to ensure a quality and low-resistance electroplated connection between copper 136 and grounded suspension component 146.

Flexure 120 therefore includes a grounded copper contact pad 136 which has been directly electrodeposited onto, and is therefore directly in electrical contact with and grounded through, stainless steel support layer 146 including any intermediate metal layer(s) 147 such as nickel. The electrical connection from the outer surface of copper contact pad 136 to ground is therefore a high quality and corrosion resistant connection. However, the process did not employ gold electrodeposited on stainless steel, which otherwise is not needed within the flexure manufacturing process and which would have therefore otherwise required additional process steps. Depending on the exact process involved, gold plating onto the stainless steel would have also required activation of the stainless steel using an acid activation bath, so eliminating the step of gold plating onto the stainless steel also reduces the use of caustic and hazardous chemicals in the flexure manufacturing process. Conductive adhesive 142 completes the mechanical and electrical bond from PZT 14 to grounded copper contact pad 136 including its protective gold layer 137. In the embodiment as shown, none of conductive adhesive 142 is dispensed or disposed over any of insulating layer 138.

A vertical line L-L through the grounding connection therefore passes through the grounded stainless steel substrate 146, an optional intermediate metal layer 147, copper contact pad 136 comprising a plated conductor, optional gold or other protective metal layer 137 on the plated conductor, conductive adhesive 142, and bottom electrode 18 of microactuator 14. The vertical line does not extend through insulating layer 138. Microactuator 14 is grounded through conductive adhesive 142, plated conductor 136, and grounded stainless steel substrate 146 without gold being plated onto the grounded stainless steel substrate as part of the flexure grounding connection of the microactuator. The grounding connection is in a straight vertical line without any jogging of the electrical ground path from the PZT to the stainless steel.

The grounding structure 160 includes conductive adhesive 142, and the grounded portions of flexure 120 including copper or other conductive layer 136 including its protective gold layer 137, metallic via 141, and grounded metal support layer 146 including nickel layer 147.

Figure 8:
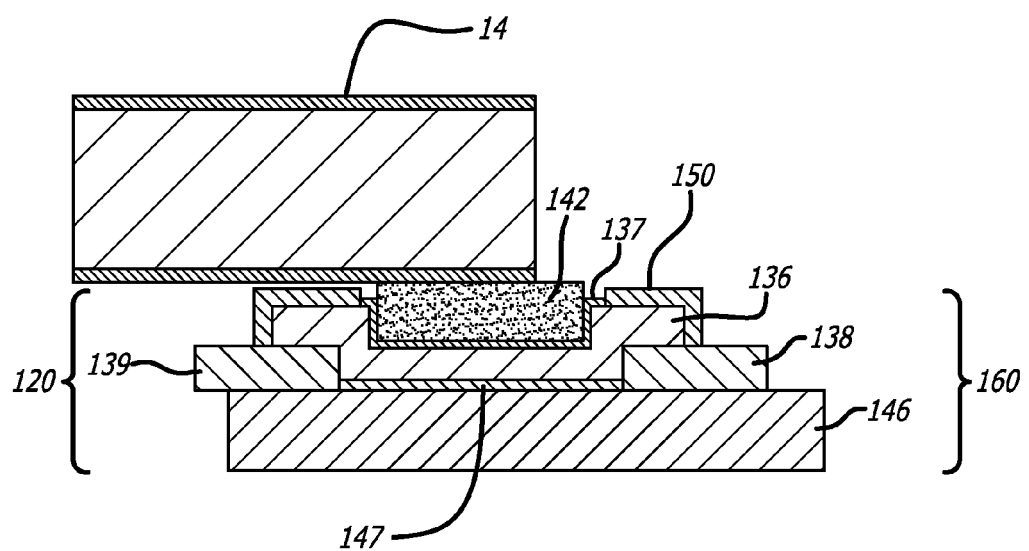
FIG. 8 is a sectional view of the suspension of FIG. 6 according to an alternative embodiment.

FIG. 8 is a sectional view of the suspension of FIG. 6 taken along section line 7-7' according to an alternative embodiment. In this embodiment insulating cover layer material 150, such as polyimide that is conventionally applied as the final layer of a flexure in order to provide electrical insulation and corrosion resistance to the copper signal traces on the flexure, is applied over copper contact pad 136 so as to form a dam. Cover layer dam 156 provides overflow control for conductive epoxy 142 while it hardens, thus helping to prevent and/or contain any overflow of epoxy.

The invention is not limited to providing a ground path to PZT microactuators. Rather, the invention can be used in the ground path of any electrical component including but not limited to other transducers, temperature sensors, strain gauges, capacitors, and resistors. More generally, the invention can be used in constructing any electrical path from a stainless steel component to an electrical component.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuator type suspension for a disk drive, the suspension having:
    a flexure comprising a grounded metal substrate, an insulating layer on the metal substrate, and a plated conductor on the insulating layer; and
    a microactuator grounded to the metal substrate through a flexure grounding connection, wherein the flexure grounding connection comprises:
        a void in the insulating layer of the flexure;
        the plated conductor extending into the void and onto the metal substrate; and
        conductive adhesive electrically and mechanically connecting the plated conductor in the void to the microactuator;
    wherein a vertical line that extends through the conductive adhesive extends through:
        the grounded metal substrate;
        the plated conductor;
        the conductive adhesive; and
        an electrode of the microactuator;
        the vertical line not extending through the insulating layer; and
    wherein the microactuator is grounded through the conductive adhesive, the plated conductor, and the grounded metal substrate without gold being plated onto the grounded metal substrate as part of the flexure grounding connection to the microactuator.

2. The suspension of claim 1 further comprising an insulating cover layer on the plated conductor adjacent the conductive adhesive, the insulating cover layer defining a dam to contain overflow of the conductive adhesive.

3. The suspension of claim 1 wherein:
the plated conductor in the void in the insulating layer of the flexure defines a metallic via;
the metal substrate comprises stainless steel; and
the flexure further includes a stainless steel gimbal upon which a read/write head is mounted, the gimbal being integrally formed with the metal substrate from a continuous sheet of stainless steel;
whereby that the microactuator is grounded through a metallic via that extends through the insulating layer of the flexure to the same stainless steel sheet of which the gimbal is integrally formed.

4. The suspension of claim 1 wherein the plated conductor comprises copper and the metal substrate comprises stainless steel.

5. The suspension of claim 1 wherein a cross-sectional area of the plated conductor within the void is larger than a footprint of the conductive adhesive.

6. The suspension of claim 1 wherein the void in the insulating layer is completely filled with the plated conductor.

7. The suspension of claim 1 wherein the conductive adhesive is disposed over the void and none of the conductive adhesive is disposed over any of the insulating layer.

8. The suspension of claim 1 wherein an intermediate layer of metal is deposited onto the metal substrate.

9. The suspension of claim 8 wherein the intermediate layer comprises nickel.

10. The suspension of claim 1 wherein:
the plated conductor comprises copper and the metal substrate comprises stainless steel; and
the grounding connection further comprises a layer of nickel on the stainless steel, the copper having been deposited onto the nickel.

11. A dual stage actuator type suspension for a disk drive, the suspension having:
a flexure comprising:
a grounded metal substrate;
an insulating layer on the metal substrate, the insulating layer having an insulating layer thickness; and
a plated copper layer on the insulating layer; and
a microactuator grounded to the metal substrate through a flexure grounding connection, wherein the flexure grounding connection comprises:
a metallic via comprising plated copper extending through an opening in the insulating layer of the flexure and extending to the metal substrate, the metallic via in the opening having a cross-sectional area whose square root is at least 5 times as large as the insulating layer thickness; and
conductive adhesive electrically connecting the microactuator to the grounded metal substrate through the metallic via.

12. The suspension of claim 11 wherein the metallic via has a cross-sectional area whose square root is at least 10 times as large as the insulating layer thickness.

13. The suspension of claim 11 wherein the metallic via has a cross sectional area that is larger than a footprint of the conductive adhesive that electrically connects the microactuator to ground.

14. The suspension of claim 11 wherein the microactuator is grounded through the conductive adhesive, the metallic via, and the grounded metal substrate without gold being plated directly onto the grounded metal substrate as part of the flexure grounding connection to the microactuator.

15. The suspension of claim 11 further comprising an insulating cover layer on the plated copper layer adjacent the conductive adhesive, the insulating cover layer defining a dam to contain overflow of the conductive adhesive.

16. The suspension of claim 11 further comprising:
nickel between the grounded metal substrate and the copper layer; and
gold between the copper layer and the conductive adhesive.

17. A dual stage actuator type suspension for a disk drive, the suspension having:
a flexure comprising a grounded metal substrate, an insulating layer on the metal substrate, and a plated conductor comprising copper on the insulating layer; and
an electrical component grounded to the metal substrate through a flexure grounding connection, the flexure grounding connection comprising:
a metallic via comprising the plated conductor extending through an opening in the insulating layer of the flexure, the metallic via being in electrical communication with the grounded metal substrate through said opening, the via having a cross-sectional area thereof where the via extends through the opening in the insulating layer; and
conductive adhesive in electrical communication with the metallic via, the conductive adhesive defining a footprint thereof where the conductive adhesive contacts the plated conductor;
wherein the via cross-sectional area is at least half as large as the conductive adhesive footprint.

18. The suspension of claim 17 wherein the via cross-sectional area is larger than the conductive adhesive footprint.

19. The suspension of claim 17 wherein the via has horizontal dimensions that are at least 5 times a thickness of the insulating layer.

20. The suspension of claim 17 wherein the grounded metal substrate comprises stainless steel, and the metallic via further comprises a metal deposited on the stainless steel to prevent diffusion of copper into the stainless steel.

\* \* \* \* \*